(12) United States Patent
Ptacek et al.

(10) Patent No.: US 10,050,541 B2
(45) Date of Patent: *Aug. 14, 2018

(54) SYNCHRONOUS RECTIFIER CONTROL WITH SECOND ASSERTION OF DRIVE SIGNAL DURING CONDUCTION PHASE

(71) Applicant: SEMICONDUCTOR COMPONENTS INDUSTRIES, LLC, Phoenix, AZ (US)

(72) Inventors: Karel Ptacek, Roznov Pod Radhostem (CZ); Tomas Tichy, Jihlava (CZ)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/802,623

(22) Filed: Nov. 3, 2017

(65) Prior Publication Data

US 2018/0054132 A1  Feb. 22, 2018

Related U.S. Application Data

(63) Continuation of application No. 15/203,533, filed on Jul. 6, 2016, now Pat. No. 9,837,916.

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 3/33592* (2013.01); *H02M 2001/0009* (2013.01)

(58) Field of Classification Search
CPC .............. H02M 3/33523; H02M 1/08; H02M 3/33592; H02M 2001/0009
See application file for complete search history.

(56) References Cited

U.S. PATENT DOCUMENTS

| 7,554,399 B1* | 6/2009 | Gaboriau | ............... H03F 1/305 330/207 A |
| 7,570,118 B1* | 8/2009 | Gaboriau | ............... H03F 1/523 330/10 |

(Continued)

OTHER PUBLICATIONS

STMicroelectronics, SRK2001 Datasheet, Adaptive Synchronous Rectification Controller for LLC Resonant Converter, May 2015.

*Primary Examiner* — Nguyen Tran
*Assistant Examiner* — Lakaisha Jackson
(74) *Attorney, Agent, or Firm* — AMPACC Law Group, PLLC

(57) ABSTRACT

A synchronous rectifier controller includes an exception timer, one or more blanking timers, and control logic. The control logic may detect a beginning of a conduction phase using a current sense signal. In response to detecting the beginning of the conduction phase, the control logic commences the exception timer, commences a first blanking interval, and asserts the drive signal. In response to an OFF condition being detected, the first blanking interval being elapsed, and the exception timer being running, the control logic de-asserts the drive signal and commences a second blanking interval. In response to an ON condition being detected, the second blanking interval being elapsed, and the exception timer being running, the control logic commences a third blanking interval and asserts the drive signal. The control logic may assert and de-assert the drive signal multiple times while the exception timer is running.

20 Claims, 4 Drawing Sheets

(56) References Cited

U.S. PATENT DOCUMENTS

| | | | | |
|---|---|---|---|---|
| 8,536,799 B1* | 9/2013 | Grisamore | ......... | H05B 33/0815 |
| | | | | 315/185 R |
| 9,680,382 B2* | 6/2017 | Vaughan | ........... | H02M 3/33507 |
| 2003/0056127 A1* | 3/2003 | Vaglica | ................ | G06F 1/3203 |
| | | | | 713/300 |
| 2014/0192575 A1* | 7/2014 | Olivik | ............... | H02M 3/33592 |
| | | | | 363/89 |
| 2015/0318790 A1* | 11/2015 | Tichy | ................ | H02M 3/33592 |
| | | | | 363/21.14 |
| 2016/0079790 A1* | 3/2016 | Kleinpenning | ..... | H02M 3/1588 |
| | | | | 320/107 |
| 2017/0040900 A1* | 2/2017 | Vaughan | ........... | H02M 3/33507 |

* cited by examiner

SYNCHRONOUS RECTIFIER CONTROL WITH SECOND ASSERTION OF DRIVE SIGNAL DURING CONDUCTION PHASE

CROSS-REFERENCE TO RELATED APPLICATIONS

This application is a Continuation of U.S. patent application Ser. No. 15/203,533, filed Jul. 6, 2016, which is hereby incorporated by reference herein in its entirety.

FIELD OF THE DISCLOSURE

The present disclosure relates generally to switched mode power supply circuits, and more particularly to switched mode power supplies that use a synchronous rectifier and that turn the synchronous rectifier on and off according to a monitored signal.

BACKGROUND

Switched Mode Power Supplies (SMPS) are widely used in a variety of applications due to their higher efficiency compared to alternatives such as linear regulators. Some SMPSs use synchronous rectification to increase the efficiency of the rectification.

In a SMPS that does not use synchronous rectification, one or more rectifiers (such as diodes) are used on the secondary side of the SMPS to convert an Alternating Current (AC) signal propagated through the transformer into a Direct Current signal at a regulated voltage or current level. Voltage drops across the one or more diodes, however (such as a 0.7 volt (V) drop across a forward-biased silicon diode) are a source of loss.

To reduce the loss due to rectification, synchronous rectification uses a switching transistor (such as a Metal-Oxide-Semiconductor Field Effect Transistor (MOSFET) or an enhancement mode gallium arsenide transistor) instead of a diode. The switching transistor, although it has an inherent body diode that would rectify the AC signal, is controlled to operate more efficiently by switching the switching transistor on when current flows in an appropriate direction, and switching the switching transistor off otherwise. Because a typical switching transistor has an on-resistance on the order of milliohms or a few tenths of a milliohm, for most power converter applications the voltage drop across the switching transistor when it is switched on is much lower than, for example, the voltage drop across a Schottky diode. Lowering the voltage drop lowers the losses caused by the voltage drop, and therefore improves the efficiency of the SMPS.

Control of the switching transistor rectifier is typically based on current through the switching transistor. During a normal conduction phase, when the stitching transistor is not yet turned on a voltage drop builds across the switching transistor, and some leakage current may pass through the body diode of the switching transistor. When the voltage drop is sensed as being greater than a first predetermined threshold, the switching transistor may be switched on. When the voltage across the switching transistor is sensed as dropping back to below a second predetermined threshold (for example, 0V), this may indicate the end of the conduction phase, and the switching transistor is turned back off to provide proper rectifier operation.

However, noise resulting from switching transients can result in false triggering of the switching transistor, leading to inefficient operation. False triggering can be alleviated by the use of minimum on and off times, which allow transients to dissipate before the sensing of the voltage drop. Thus, transients that occur during these "blanking" intervals are ignored and have no effect on the switch control of the switching transistor rectifier.

Furthermore, reactive components in the SMPS, such as inductors and capacitors, can cause distortions of the sensed voltage drop across the switching transistor.

The noise and distortions may cause a premature sensing of the end of the conduction phase, and a corresponding premature turn off of the switching transistor, that is, the switching transistor may be turned off well before the conduction phase ends.

The body diode of the switching transistor continues to conduct during the conduction phase when the switching transistor is turned off. Because the body diode has a higher voltage drop than the voltage drop across the turned-on switching transistor, prematurely turning off the switching transistor causes an increase in losses due to the voltage drop of the rectification circuit and reduces the efficiency of the SMPS.

Accordingly, there is a need for a method and an apparatus for self-synchronous rectifier control that prevent efficiency losses due to conditions that may cause a premature turn-off of the switching transistor.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
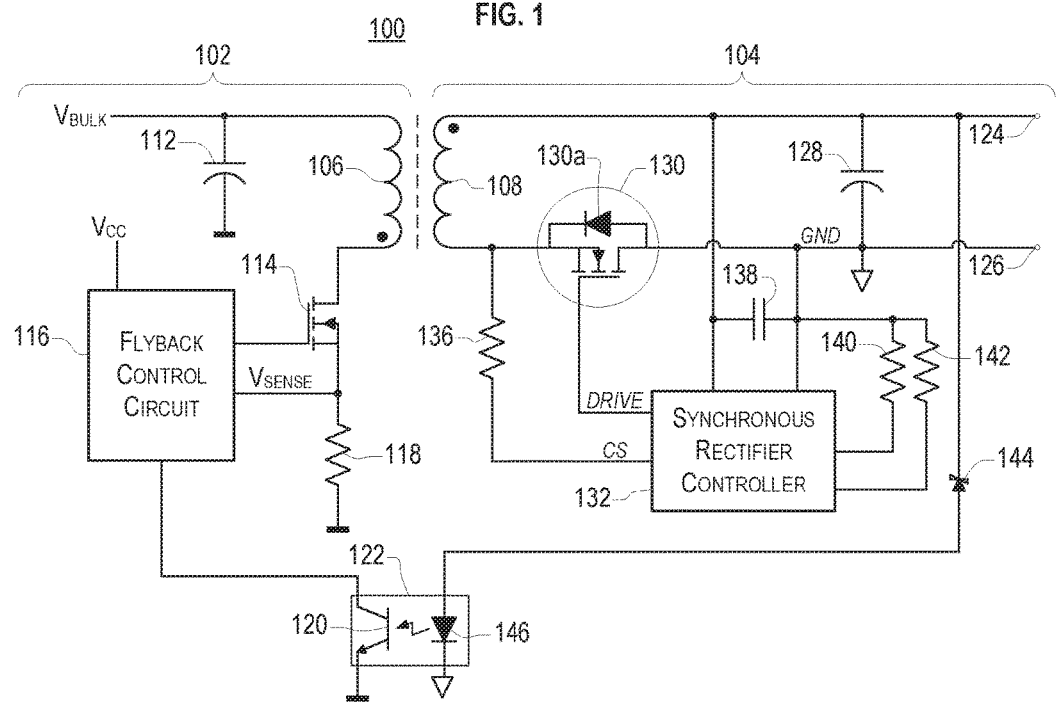
FIG. 1 illustrates a Switched Mode Power Supply (SMPS) according to an embodiment.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of the embodiments.

The apparatus and method components have been represented where appropriate by conventional symbols in the drawings, showing only those specific details that are pertinent to understanding the embodiments. This serves to not obscure the disclosure with details that will be readily apparent to those of ordinary skill in the art having the benefit of the disclosures herein. The details of well-known elements, structures, or processes that are necessary to practice the embodiments and that are well known to those of skill in the art may not be shown and should be assumed to be present unless otherwise indicated.

DETAILED DESCRIPTION

The present disclosure relates generally to switched mode power supply circuits, and more particularly to switched mode power supplies that use a synchronous rectifier and that turn the synchronous rectifier on and off according to a monitored signal.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a switched mode power supply (SMPS) 100 in accordance with some embodiments. The SMPS 100 can be, for example, a flyback power supply or converter, which is one of the known SMPS topologies commonly used. A transformer defines a primary side 102 and a secondary side 104, and includes a primary winding 106 on the primary side 102 and a secondary winding 108 on the secondary side 104. The primary side 102 is DC-isolated from the secondary side 104.

On the primary side 102, a bulk voltage $V_{BULK}$ is evident across a bulk capacitor 112, and is typically derived from rectification of an AC source, such as conventional AC commercial service (i.e., 110 V AC or 220 V AC). Current is switched through the primary winding 106 by a switch 114, which is controlled by flyback control circuitry 116.

The current through the primary winding 106 can be sensed using a sense resistor 118. The sense resistor 118 produces a sensing voltage $V_{SENSE}$ that is proportional to the current through the primary winding 106. The flyback control circuitry can also sense an output level at an output of the secondary side 104 using an opto-transistor 120 in an opto-isolator 122.

The output of secondary side 104 is produced between a positive output 124 and a ground 126, and is supported by a bulk capacitor 128. Feedback to the primary side 102 is facilitated by a zener diode 144 that is coupled to a light emitting diode 146 in the opto-isolator 122.

The rectification operation is provided by a MOSFET 130 that includes a body diode 130a. In the example shown in FIG. 1, the MOSFET 130 is an N-channel MOSFET with its drain connected to the secondary winding 108 and its source connected to the ground 126, but embodiments are not limited thereto.

A synchronous rectifier controller (SRC) 132 switches the MOSFET 130 on and off using a drive signal DRIVE connected to a gate of the MOSFET 130. The SRC 132 senses the current through the secondary winding 108 by sensing a voltage drop across the drain and source of the MOSFET 130 by way of a current sense signal CS and a ground terminal, respectively. In some embodiments, a current sense resistor 136 is used to level-shift the current sense signal CS, but in other embodiment the current sense resistor 136 is replace with a zero ohm line.

The SRC 132 uses the current sense signal CS to determine when to switch the MOSFET 130 on and off. A decoupling capacitor 138 facilitates the switching of the MOSFET 130 by providing a voltage to the SRC 132.

The SRC 132 utilizes on and off time blanking to prevent false triggering due to transients. In an embodiment, minimum durations of the on and off time blanking are set by first and second timing resistors 140 and 142, respectively.

To prevent synchronization errors from, for example, errant transients that would otherwise falsely trigger the blanking timers, the SRC 132 employs self-synchronization to avoid false triggering of blanking times by allowing a reset of blanking times based on the current sense signal CS.

An SMPS known in the art may operate based on an assumption that a secondary side current has a sinusoidal shape. However, in an SMPS using a resonant mode inductor-inductor-capacitor (LLC) topology, under certain conditions, a secondary side current sensed by the current sense signal CS is not sinusoidal as would usually be expected. For example, in an SMSP having the LLC topology and operating at light and medium load conditions, parasitic impedances may distort the shape of the secondary side current. When these distortions occur, the voltage values of the current sense signal CS has a shape that includes a triangular capacitive peak and a fraction of a sinusoid, such as shown in FIG. 2.

In some embodiments having two channels (such as a first channel for a positive phase of a transformer output and a second channel for a negative phase of the transformer output) differences between the two channels may further distort the current sense signal CS.

Figure 2:
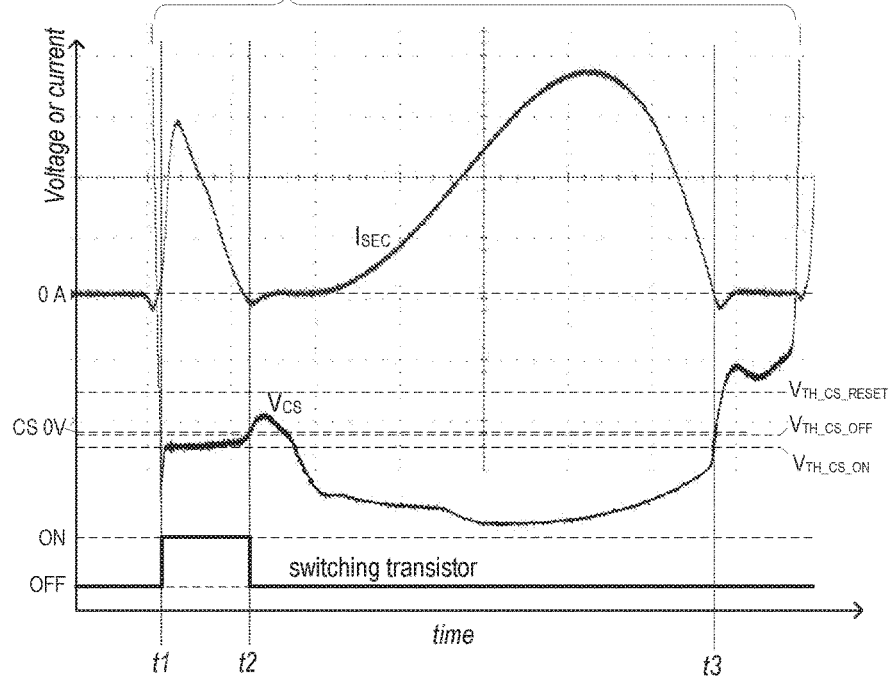
FIG. 2 illustrates operation of an SMPS when a secondary side current of the SMPS is distorted.

FIG. 2 illustrates operation of an SMPS (e.g., the SMPS 100 of FIG. 1) when a secondary side current of the SMPS is distorted. In particular, FIG. 2 shows a secondary side current $I_{SEC}$ and a current sense signal voltage $V_{CS}$ during a conduction phase (starting at a first time t1 and ending at a third time t3) when the SMPS 100 is experiencing distortion of the secondary side current $I_{SEC}$.

The current sense signal voltage $V_{CS}$ corresponds to a voltage value of the current sense signal CS of FIG. 1. Accordingly, when current is flowing through the switching transistor 130 during the conduction phase, the voltage value of the current sense signal CS is normally less than that of the ground GND, i.e., the voltage value is negative. When the body diode 130a of the switching transistor 130 is reversed biased (such as during a non-conduction phase), the voltage value of the current sense signal CS is normally greater than that of the ground GND.

In an implementation, the SMPS 100 determines that a conduction phase has begun when the current sense signal voltage $V_{CS}$ has a value below an ON threshold $V_{TH\_CS\_ON}$, the ON threshold $V_{TH\_CS\_ON}$ having a negative value. The SMPS 100 determines that a conduction phase is effectively ended when the current sense signal voltage $V_{CS}$ has a value above an OFF threshold $V_{TH\_CS\_OFF}$, the OFF threshold $V_{TH\_CS\_OFF}$ having a negative value that is greater than the value of the ON threshold $V_{TH\_CS\_ON}$. The current sense signal voltage $V_{CS}$ having a value above the OFF threshold $V_{TH\_CS\_OFF}$, indicates that only a small amount of current, if any, is flowing through the switching transistor 130.

Accordingly, at a first time t1 at the beginning of the conduction phase, current flows through the body diode 130a and the current sense signal voltage $V_{CS}$ drops below an ON threshold $V_{TH\_CS\_ON}$ and the SRC 132 of the SMPS 100 turns on a switching transistor configured to perform synchronous rectification.

At a second time t2, as a result of the distortion of the secondary side current $I_{SEC}$ by the parasitic impedances, the current sense signal voltage $V_{CS}$ rises above an OFF threshold $V_{TH\_CS\_OFF}$ but not above a RESET threshold $V_{TH\_CS\_RESET}$. As a result, the SRC 132 of the SMPS 100 turns off the switching transistor.

Although the current sense signal voltage $V_{CS}$ drops below the ON threshold $V_{TH\_CS\_ON}$ during the remainder of the conduction phase, the switching transistor stays off for the remainder (from the second time t2 to the third time t3) of the conduction phase. During this time, a body diode of the switching transistor performs rectification instead of the switching transistor. Because the body diode has a higher voltage drop than the turned-on switching transistor, losses in the SMPS are increased and an efficiency of the SMPS is reduced compared to a case when the switching transistor remains on until the third time t3.

The reduced efficiency caused by prematurely turning off the switching transistor may also cause oscillations in the amount of power delivered by the primary side to the secondary side. In response to the reduced efficiency during the present conduction phase, the primary side may determine to deliver more power to the secondary side in the next conduction phase. The increase in the supplied power may prevent the premature turning off the switching transistor, resulting in an oversupply of power to the secondary side in the next conduction cycle. As a result of the oversupply of power, the primary side may determine to deliver less power to the secondary side in the subsequent conduction phase, which may result in the premature turning off the switching transistor, causing the cycle of under-supply and over-supply to repeat.

In an embodiment, control logic of an SRC uses an exception timer to reduce the effects of premature turn-off of a switching transistor used for synchronous rectification. During the duration of the exception timer, when the switching transistor is off, the SRC turns the switching transistor back on when conditions for doing so are satisfied.

Figure 3:
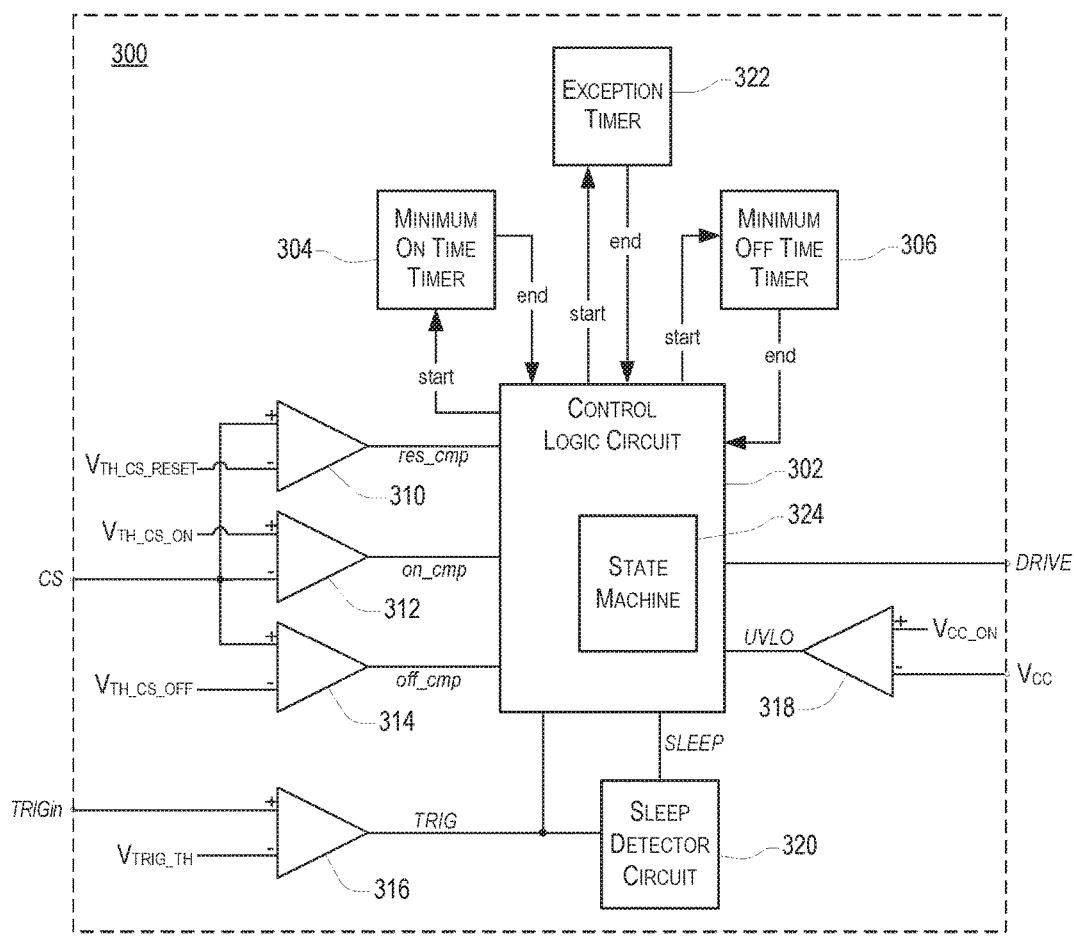
FIG. 3 illustrates a synchronous rectifier controller according to an embodiment.

FIG. 3 illustrates a synchronous rectifier controller (SRC) 300 according to an embodiment of the current disclosure. The SRC 300 is suitable for use as the SRC 132 of FIG. 1. The SRC 300 includes control logic 302, a minimum on time timer 304, a minimum off time timer 306, an exception timer 322, first to fifth voltage comparators 310 to 318, and a sleep detector 320.

The SRC 300 receives a current sense signal CS. The first comparator 310 generates a RESET comparator signal res_cmp by comparing a voltage value of the current sense signal CS to a RESET threshold $V_{TH\_CS\_RESET}$. The second comparator 312 generates an ON comparator signal on_cmp by comparing the voltage value to an ON threshold $V_{TH\_CS\_ON}$. The third comparator 314 generates an OFF comparator signal off_cmp by comparing the voltage value to an OFF threshold $V_{TH\_CS\_OFF}$. The OFF comparator signal off_cmp, ON comparator signal on_cmp, and RESET comparator signal res_cmp respectively indicate whether the voltage value of the current sense signal CS is greater than or less than the OFF threshold $V_{TH\_CS\_OFF}$, ON threshold $V_{TH\_CS\_ON}$, and RESET threshold $V_{TH\_CS\_RESET}$.

The control logic 302 generates a drive signal DRIVE that is used, in an embodiment, to control a switching transistor in order to provide synchronous rectification.

The control logic 302 also controls the minimum on time timer 304 and the minimum off time timer 306 in order to determine a minimum on time and a minimum off time, respectively. The minimum on time and minimum off time correspond to durations of blanking intervals during which one or more of the ON comparator signal on_cmp, the OFF comparator signal off_cmp, and the RESET comparator signal res_cmp are prevented from influencing the operation of the control logic 302.

For example, in an embodiment, during a first blanking interval corresponding to the minimum off time, the control logic 302 ignores the ON comparator signal on_cmp, and during a second blanking interval corresponding to the minimum on time, the control logic 302 ignores the OFF comparator signal off_cmp.

A blanking interval begins when the control logic commences the corresponding timer, and the blanking interval ends when the corresponding timer lapses, that is, when the corresponding timer stops running.

Although FIG. 3 illustrates an embodiment having both the minimum on time timer 304 and the minimum off time timer 306, embodiments are not limited thereto. In an embodiment, a single programmable timer is used to generate a plurality of blanking intervals having different durations. In another embodiment, respective timers are provided for blanking intervals having respectively unique durations.

In an embodiment, a duration of the minimum on time timer 304 is a predetermined value. In another embodiment, the duration of the minimum on time timer 304 is a programmable value that may be set using, for example, a resistor such as the first timing resistor 140 of FIG. 1.

In an embodiment, the minimum on time timer 304 may have a first duration and a second duration, and the control logic 302 indicates which duration to use when the operation of the minimum on time timer 304 is commenced. In an embodiment, the first duration is programmable and the second duration is a predetermined fraction of the first duration.

In an embodiment, a duration of the minimum off time timer 306 is a predetermined value. In another embodiment, the duration of the minimum off time timer 306 is a programmable value that may be set using, for example, a resistor such as the second timing resistor 142 of FIG. 1.

Furthermore, the control logic 302 restarts the minimum off time timer 306 (that is, reinitializes it to its starting value) whenever the RESET comparator signal res_cmp indicates that the voltage value of the current sense signal CS is below the RESET threshold $V_{TH\_CS\_RESET}$. As a result, the minimum off time timer 306 outputs its end signal when the duration of the minimum off time timer 306 has elapsed since the most recent of i) a most recent time the minimum off time timer 306 was started and ii) a most recent time when the current sense signal CS had a value below the RESET threshold $V_{TH\_CS\_RESET}$.

Resetting the minimum off time timer 306 when the voltage value of the current sense signal CS falls below the RESET threshold $V_{TH\_CS\_RESET}$ prevents short-term excursions above the RESET threshold $V_{TH\_CS\_RESET}$, such as those produced by transients, from causing a false start of the minimum off time timer 306.

The control logic 302 also controls the exception timer 322 to determine a duration of an exception interval.

The fourth comparator 316 generates a trigger comparator signal TRIG_cmp by comparing a trigger input TRIGin with a trigger threshold $V_{TRIG\_TH}$. The control logic 302 responds to assertion of the trigger signal TRIG by disabling the drive signal DRIVE. The trigger input TRIGin can be used to disable switching operation of the SRC 300 for a short period of time, such as one conduction phase, during which period of time only the body diode of the switching transistor performs rectification.

In an embodiment, the trigger signal TRIG is used by a sleep detector 320 to commence a sleep mode by asserting a sleep signal SLEEP to the control logic 302. The sleep mode is used as a long term disable state to suppress synchronous rectification operation, such as under very light load conditions, for example.

The fifth comparator 318 generates an undervoltage lockout signal UVLO by comparing a supply voltage $V_{CC}$ to a supply voltage threshold $V_{CC\_ON}$. When the undervoltage lockout signal UVLO indicates that the supply voltage $V_{CC}$ is less than the supply voltage threshold $V_{CC\_ON}$, the control logic 302 does not perform synchronous rectifier operations. When the undervoltage lockout signal UVLO indicates that the supply voltage $V_{CC}$ is greater than the supply voltage threshold $V_{CC\_ON}$, the control logic 302 performs synchronous rectifier operations unless it has been otherwise disabled.

In an embodiment, a state machine 324 within the control logic 302 controls the operation of the control logic 302.

In an embodiment, the SRC 300 is implemented as a semiconductor device in an integrated circuit (IC) package. The IC package can include other circuitry as well in some embodiments. Some embodiments include a method of forming a SRC such as that exemplified in FIG. 3, such as, for example, forming control logic, forming a RESET comparator, an OFF comparator, an ON comparator, a TRIG comparator, and an a UVLO comparator, and forming minimum off time, minimum on time, and exception timers. In an embodiment, one or more of the minimum off time, minimum on time, and exception timers are externally configurable so that the duration of each timer can be tailored for particular applications.

Figure 4:
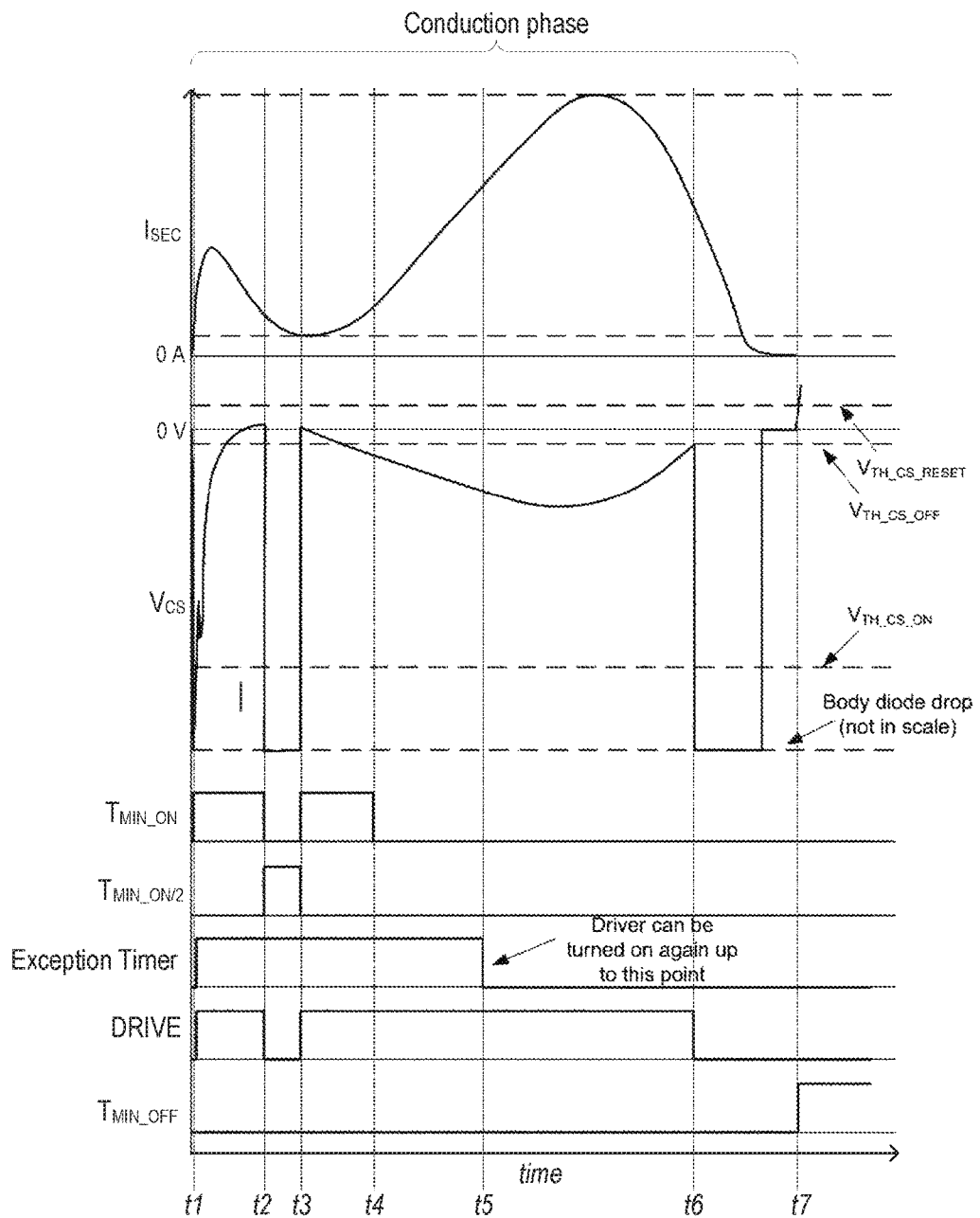
FIG. 4 is a timing diagram of signals in a synchronous rectifier controller according to an embodiment.

FIG. 4 shows waveforms illustrating an operation of the SRC 300 according to an embodiment. In particular, FIG. 4 illustrates the operation of the SRC 300 when an SMPS incorporating the SRC 300 experiences distortion of a secondary side current $I_{SEC}$.

FIG. 4 illustrates a case in which both the undervoltage lockout signal UVLO and the trigger signal TRIG are de-asserted, so that the SRC 300 performs synchronous rectification.

At a first time t1 at the beginning of a conduction phase, current flows through a body diode of a switching transistor under the control of the SRC 300. As a result, a current sense signal voltage $V_{CS}$ drops below an ON threshold $V_{TH\_CS\_ON}$.

When the SRC 300 determines that the current sense signal voltage $V_{CS}$ is below the ON threshold $V_{TH\_CS\_ON}$, the SRC 300 turns on the switching transistor, starts the minimum on time timer 304, and starts the exception timer 322. The $T_{MIN\_ON}$ signal shown in FIG. 4 goes high at the first time t1 to indicate that the minimum on time timer 304 is running (that is, it has been started but has not yet ended), and is low otherwise. The Exception Timer signal shown in FIG. 4 goes high at the first time t1 to indicate that the exception timer 322 is running, and is low otherwise.

While the minimum on time timer 304 is running, the SRC 300 will not turn off the switching transistor based on the current sense signal voltage $V_{CS}$ (but may change the state of the switching transistor based on other inputs). This prevents high-frequency noise and transients from causing spurious switching of the switching transistor while the minimum on time timer 304 is running.

At a second time t2, the minimum on time timer 304 outputs an end signal to indicate the end of the predetermined duration of the minimum on time, that is, that the minimum on time timer 304 is not running.

As a result of the distortion of the secondary side current $I_{SEC}$ by the parasitic impedances, the current sense signal voltage $V_{CS}$ has risen above an OFF threshold $V_{TH\_CS\_OFF}$. Because the minimum on time has ended, the exception timer 322 is still running, and the current sense signal voltage $V_{CS}$ is above the OFF threshold $V_{TH\_CS\_OFF}$, the SRC 300 de-asserts the DRIVE signal to turn off the switching transistor.

Because the SRC 300 turned off the switching transistor while the exception timer 322 was still running at the second time t2, the SRC 300 also starts the minimum on time timer 304 at the second time t2, as indicated in FIG. 4 by the $T_{MIN\_TON/2}$ signal going high. In this embodiment, the SRC 300 configures the minimum on time timer 304 to run for a duration that is a portion (e.g., one-half) of the duration of the minimum on time used at the first time t1.

In another embodiment, the SRC 300 may use a separate timer to provide the function provided by the minimum on time timer 304 during the interval between the second time t2 and the third time t3.

While the minimum on time timer 304 is running, the SRC 300 will not turn on the switching transistor based on the current sense signal voltage $V_{CS}$.

Because the switching transistor was turned off at the second time t2, the body diode of the switching transistor begins conducting the secondary side current $I_{SEC}$ at that time. Because the voltage drop of the body diode is larger than the voltage drop that was across the switching transistor when the transistor was turned on, the current sense signal voltage $V_{CS}$ drops to a value corresponding to the diode body drop.

At a third time t3, the minimum on time timer 304 outputs an end signal to indicate the end of the duration it was configured to run for. Because the body diode is conducting the secondary side current $I_{SEC}$, the current sense signal voltage $V_{CS}$ is below the ON threshold $V_{TH\_CS\_ON}$. As a result, the SRC 300 asserts the drive signal to turn the switching transistor back on and starts the minimum on time timer 304.

At a fourth time t4, the minimum on time timer 304 outputs an end signal to indicate the end of the predetermined duration of the minimum on time, that is, that the minimum on time timer 304 is not running. Because the current sense signal voltage $V_{CS}$ is below the OFF threshold $V_{TH\_CS\_OFF}$, the SRC 300 leaves the switching transistor turned on.

At a fifth time t5, the exception timer 322 outputs an end signal to indicate the end of a predetermined exception time duration, that is, that the exception timer 322 is no longer running.

At a sixth time t6, the current sense signal voltage $V_{CS}$ increases to above the OFF threshold $V_{TH\_CS\_OFF}$. Because the minimum on time timer 304 is not running and the current sense signal voltage $V_{CS}$ is above the OFF threshold $V_{TH\_CS\_OFF}$, the SRC 300 de-asserts the DRIVE signal to turn the switching transistor off. Because the exception timer 322 is no longer running, the SRC 300 does not turn the switching transistor back on again until a next conduction phase.

At a seventh time t7, the current sense signal voltage $V_{CS}$ rises to above a RESET threshold $V_{TH\_CS\_RESET}$, at which point the minimum off time timer 306 starts running. The SRC 300 determines that the next conduction phase has started when the minimum off time timer 306 has finished running and the current sense signal voltage $V_{CS}$ is below the ON threshold $V_{TH\_CS\_ON}$.

Figure 5:
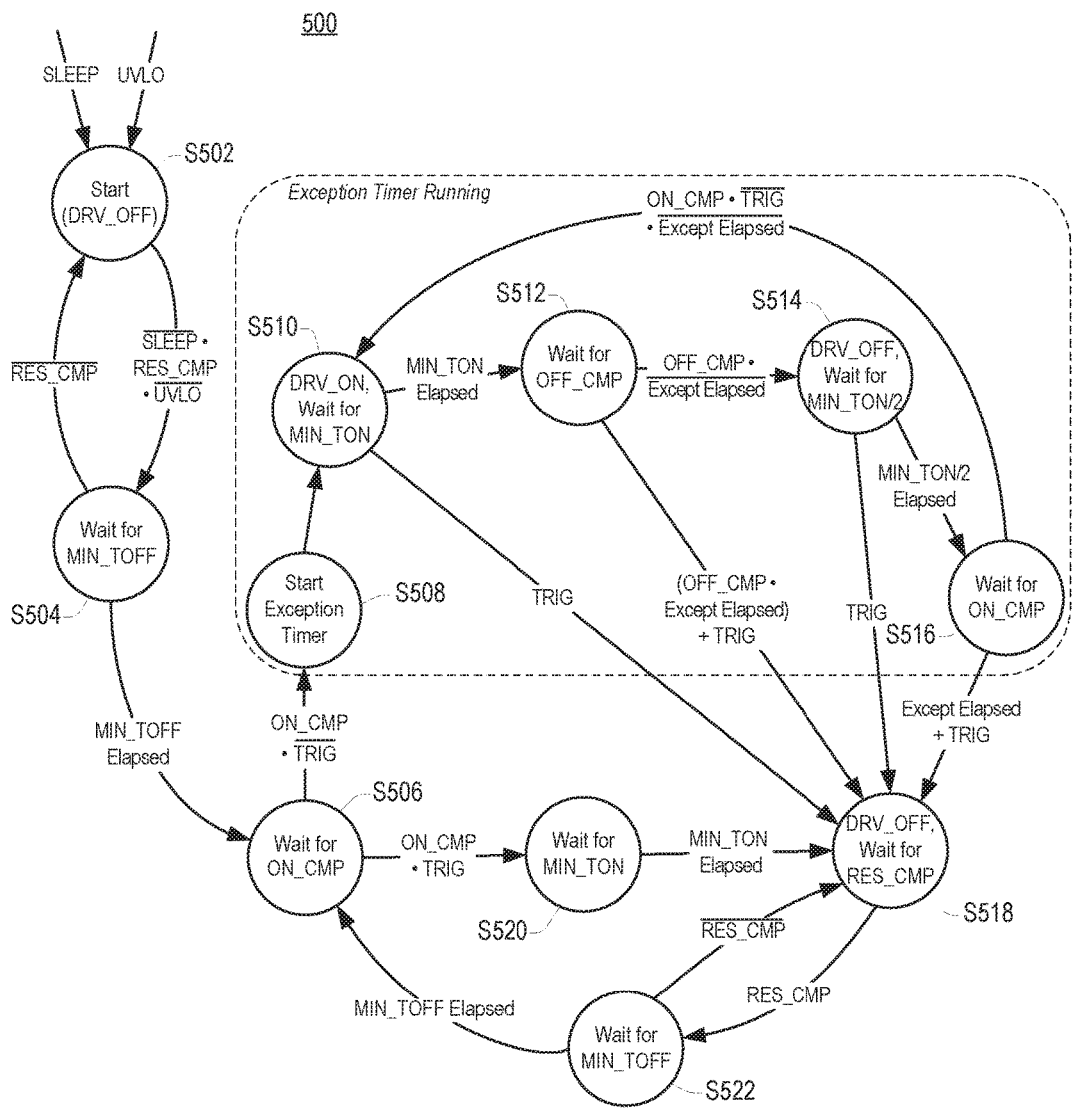
FIG. 5 is a state diagram of operation of a synchronous rectifier controller according to an embodiment.

FIG. 5 is a state diagram 500 of operation of a state machine of a Synchronous Rectifier Controller (SRC) according to an embodiment. The state diagram 500 can represent operations of the state machine 324 of the SRC 300 of FIG. 3. In the diagram, a plus symbol "+" represents an OR operation, a dot symbol "•" represents an AND operation, and an overline represents a NOT operation.

The state diagram 500 shows operations that are performed in response to a SLEEP signal, a UVLO signal, a TRIG signal, an ON_CMP signal, an OFF_CMP signal, and a RES_CMP signal.

The UVLO signal is an undervoltage lockout signal that is asserted when an undervoltage condition is detected and is de-asserted otherwise. The SLEEP signal is asserted when operations of the SRC are to be suspended for an extended period of time and is de-asserted otherwise. The TRIG signal is asserted when operations of the SRC are to be suspended for a brief period of time and is de-asserted otherwise.

The ON_CMP signal is asserted when a current sensing signal indicates conditions associated with a beginning of a conduction phase are detected, such as when a magnitude of a voltage drop across a switching transistor used to perform synchronous rectification is greater than an ON threshold, and is de-asserted otherwise. For example, in an embodiment wherein the ON threshold corresponds to a negative voltage, and the ON_CMP signal is asserted when the voltage drop across the switching transistor is a negative voltage that is less (that is, more negative) than the ON threshold.

The OFF_CMP signal is asserted when a current sensing signal indicates conditions associated with an end of the conduction phase are detected, such as when a magnitude of a voltage drop across the switching transistor is less than an OFF threshold or has a polarity opposite the polarity of the OFF threshold, and is de-asserted otherwise. For example, in an embodiment wherein the OFF threshold corresponds to a negative voltage, and the OFF_CMP signal is asserted when the voltage drop across the switching transistor is greater than the OFF threshold.

The RES_CMP signal is asserted when a current sensing signal indicates that a conduction phase has ended and a non-conduction phase has begun, and is de-asserted otherwise. For example, in an embodiment the RES_CMP signal is asserted when the current sensing signal has an opposite polarity compared to when current is flowing through the body diode of the switching transistor and the magnitude of the current sensing signal is greater than a RESET threshold.

The state diagram 500 also shows operations that are performed in response to the elapsing of durations respectively associated with a MIN_TON timer, a MIN_TON/2 timer, a MIN_TOFF timer, and an Exception (Except) timer. Each of these timers has a predetermined duration. The Except timer can run at the same time as any of the MIN_TON timer, the MIN_TON/2 timer, and the MIN_TOFF timer.

The state machine controls the starting of the MIN_TON timer, the MIN_TON/2 timer, the MIN_TOFF timer, and the Except timer, and detects when the respective durations of those timers have respectively elapsed, that is, when the respective timers are no longer running.

The state machine also controls a switching transistor using a DRIVE signal. In embodiments, the switching transistor is configured to perform synchronous rectification.

The state machine enters a start state S502 whenever the SLEEP signal or the UVLO signal is asserted. When the state machine is in the start state S502, the SLEEP signal is de-asserted, the UVLO signal is de-asserted, and the RES_CMP signal is asserted, the state machine transitions to the Wait for MIN_TOFF state S504. Otherwise, the state machine remains in the start state S502.

The Wait for MIN_TOFF state S504 corresponds to conditions wherein the state machine is waiting for a minimum off time to elapse after a prior non-conduction phase.

When the state machine is in the Wait for MIN_TOFF state S504 and the RES_CMP signal is de-asserted, the state machine transitions to the start state S502. When the state machine is in the Wait for MIN_TOFF state S504, the RES_CMP signal is asserted, and the MIN_TOFF timer is no longer running (indicating that the MIN_TOFF duration has elapsed), the state machine transitions to a first Wait for ON_CMP state S506. Otherwise, the state machine remains in the Wait for MIN_TOFF state S504.

The first Wait for ON_CMP state S506 corresponds to conditions wherein the state machine is waiting for detection of a beginning of a conduction phase.

When the state machine is in the first Wait for ON_CMP state S506, the ON_CMP signal is asserted, and the TRIG signal is de-asserted, the state machine transitions to a start exception timer state S508. When the state machine is in the first Wait for ON_CMP state S506, the ON_CMP signal is asserted, and the TRIG signal is asserted, the state machine transitions to a Wait for MIN_TON state S520. Otherwise, the state machine remains in the first Wait for ON_CMP state S506.

When the state machine is in the start exception timer state S508, the state machine starts the Except timer running and transitions to a DRV_ON state S510.

The DRV_ON state S510 corresponds to conditions wherein the state machine will assert the DRIVE signal to turn the switching transistor on and will maintain the switching transistor on for a blanking interval to prevent noise from causing it to spuriously turn off. When the state machine enters the DRV_ON state S510, the state machine turns the switching transistor on using the DRIVE signal and commences the MIN_TON timer.

When the state machine is in the DRV_ON state S510 and the TRIG signal is asserted, the state machine transitions to a second DRV_OFF state S518. When the state machine is in the DRV_ON state S510 and the duration of the MIN_TON timer elapses, the state machine transitions to a Wait for OFF_CMP state S512. Otherwise, the state machine remains in the DRV_ON state S510.

The Wait for OFF_CMP state S512 corresponds to conditions wherein the state machine is determining whether to turn the switching transistor off.

When the state machine is in the Wait for OFF_CMP state S512, the OFF_CMP signal is asserted, and the duration of the Exception timer has not elapsed, the state machine transitions to a first DRV_OFF state S514. When the state machine is in the Wait for OFF_CMP state S512 and either i) the TRIG signal is asserted, ii) the OFF_CMP signal is asserted and the duration of the Exception timer has elapsed, or iii) both, the state machine transitions to the second DRV_OFF state S518. Otherwise, the state machine remains in the Wait for OFF_CMP state S512.

The first DRV_OFF state S514 corresponds to conditions wherein the switching transistor has been turned off and is being maintained off for a blanking interval to prevent noise from causing it to spuriously turn back on, and wherein the switching transistor might be turned on again during the current conduction phase once the blanking interval expires. When the state machine enters the first DRV_OFF state S514, the state machine turns the switching transistor off using the DRIVE signal and commences the MIN_ON/2 timer.

When the state machine is in the first DRV_OFF state S514 and the TRIG signal is asserted, the state machine transitions to the second DRV_OFF state S518. When the state machine is in the first DRV_OFF state S514, the TRIG signal is de-asserted, and the duration of the MIN_ON/2 timer has elapsed, the state machine transitions to the second Wait for ON_CMP state S516. Otherwise, the state machine remains in the first DRV_OFF state S514.

The second Wait for ON_CMP state S516 corresponds to conditions wherein the SRC is determining whether to turn the switching transistor back on.

When the state machine is in the second Wait for ON_CMP state S516 and i) the TRIG signal is asserted, ii) the duration of the Exception Timer elapses, or II) both, the state machine transitions to the second DRV_OFF state S518. When the state machine is in the second Wait for ON_CMP state S516, the TRIG signal is de-asserted, the duration of the Exception Timer has not elapsed, and the ON_CMP signal is asserted, the state machine transitions to the DRV_ON state S510. Otherwise, the state machine remains in the Wait for ON_CMP state S516.

The second DRV_OFF state S518 corresponds to conditions wherein the switching transistor has been turned off and will not be turned on again during the current conduction phase. When the state machine enters the second DRV_OFF state S518, the machine turns the switching transistor off using the DRIVE signal.

When the state machine is in the second DRV_OFF state S518 and the RES_CMP signal is asserted, the state machine transitions to a Wait for MIN_TOFF state S522. Otherwise, the state machine remains in the second DRV_OFF state S518.

The Wait for MIN_TOFF state S522 corresponds to conditions wherein the state machine is waiting for the duration of the MIN_TOFF timer to elapse without the RES_CMP signal being de-asserted. When the state machine enters the Wait for MIN_TOFF state S522, the state machine commences the MIN_TOFF timer.

When the state machine is in the Wait for MIN_TOFF state S522 and the RES_CMP signal is de-asserted, the state machine transitions back to the second DRV_OFF state S518. When the state machine is in the Wait for MIN_TOFF state S522, the RES_CMP signal is asserted, and the duration of the MIN_TOFF timer elapses, the state machine transitions to the first Wait for ON_CMP state S506. Otherwise, the state machine remains in Wait for MIN_TOFF state S522.

The Wait for MIN_TON state S520 corresponds to conditions wherein the start of a conduction phase was detected but the TRIG signal indicates that the SRC is not to operate during the conduction phase. When the state machine enters the Wait for MIN_TON state S520, the state machine commences the MIN_TON timer and waits for a corresponding blanking interval to prevent noise from causing a premature determination that the conduction phase has ended.

When the state machine is in the Wait for MIN_TON state S520 and the duration of the MIN_TON timer has elapsed, the state machine transitions to the second DRV_OFF state S518.

Embodiments of the present disclosure include electronic devices configured to perform one or more of the operations described herein. However, embodiments are not limited thereto.

Embodiments of the present disclosure may be implemented by executing program instructions using various computer means, such as a processor or microcontroller, and recorded in a non-transitory computer-readable medium. The non-transitory computer-readable medium may include one or more of program instructions, data files, data structures, and the like. In an embodiment, the non-transitory computer-readable medium may include a read only memory (ROM), a random access memory (RAM), or a flash memory.

While illustrative embodiments have been disclosed to aide in the understanding of the disclosure, embodiments are not limited thereto, but are instead limited only by the scope of the appended claims. Embodiment may include various modifications and equivalent arrangements included within the scope of the appended claims. The order of operations described in embodiments is illustrative and may be re-ordered unless otherwise constrained. Further, features of two or more embodiments may be combined to form a new embodiment.

What is claimed is:

1. A method for controlling a drive signal in a synchronous rectifier controller (SRC), the method comprising:
   detecting a beginning of a conduction phase using a current sense signal;
   performing, in response to detecting the beginning of the conduction phase, a first assertion of the drive signal; and
   during the conduction phase:
   detecting an occurrence of an OFF condition after performing the first assertion of the drive signal,
   performing a de-assertion of the drive signal in response to detecting the occurrence of the OFF condition,
   detecting an occurrence of an ON condition after performing the de-assertion of the drive signal, and
   performing a second assertion of the drive signal in response to the ON condition being detected.

2. The method of claim 1, further comprising:
   commencing an exception timer in response to detecting the beginning of the conduction phase, the exception timer running for an exception timer duration,
   wherein performing the second assertion of the drive signal requires the exception timer be running.

3. The method of claim 2, further comprising:
   detecting an end of the conduction phase using the current sense signal,
   wherein detecting the end of the conduction phase requires the exception timer not be running.

4. The method of claim 1, further comprising:
   detecting an end of the conduction phase using the current sense signal; and
   commencing a minimum off timer in response the detecting the end of the conduction phase, the minimum off timer having a predetermining minimum off duration,
   wherein detecting the beginning of the conduction phase requires the minimum off timer not be running.

5. The method of claim 1, further comprising:
   commencing a minimum on timer in response the first assertion of the drive signal, the minimum on timer having a predetermining minimum on duration,
   wherein detecting the OFF condition requires the minimum on timer not be running.

6. The method of claim 1, further comprising:
   commencing a half minimum on timer, in response the de-assertion of the drive signal, the half minimum on timer having a predetermining half minimum on duration,
   wherein detecting the occurrence of the ON condition requires the half minimum on timer not be running.

7. The method of claim 1, wherein detecting the occurrence of the ON condition includes comparing a voltage of the current sense signal an ON threshold.

8. The method of claim 1, wherein detecting the occurrence of the OFF condition includes comparing a voltage of the current sense signal an OFF threshold.

9. A Synchronous Rectifier Controller (SRC), comprising:
   a comparator; and
   a control logic circuit that:
   receives an output of the comparator,
   detects a beginning of a conduction phase,
   performs a first assertion of a drive signal in response to the detection of the beginning of the conduction phase,
   de asserts the drive signal in response to detecting an OFF condition, and performs a second assertion of the drive signal during the conduction phase.

10. The SRC of claim 9, further comprising:
an exception timer,
wherein the control logic circuit:
directs the exception timer to generate an exception interval in response to the detection of the beginning of the conduction phase, the exception interval having a predetermined duration, and
performs the second assertion of the drive signal only during the exception interval.

11. The SRC of claim 10, wherein the predetermined duration is externally configurable.

12. The SRC of claim 9, further comprising:
a minimum time timer,
wherein the control logic circuit:
directs the minimum time timer to generate an off interval in response to the control logic circuit de asserting the drive signal; and
performs the second assertion of the drive signal only after an end of the off interval.

13. The SRC of claim 9, further comprising:
a sensing circuit that receives a current sense signal and produces a sensed voltage according to the received current sense signal,
wherein the control logic circuit:
detects the beginning of the conduction phase using the sensed voltage,
detects the OFF condition using the sensed voltage,
detects an ON condition using the sensed voltage, and
performs the second assertion in response to detecting the ON condition.

14. The SRC of claim 13,
wherein the SRC detects the beginning of the conduction phase by comparing the sensed voltage to a first predetermined value,
wherein the SRC detects the OFF condition by comparing the sensed voltage to a second predetermined value different from the first predetermined value, and
wherein the SRC detects the ON condition by comparing the sensed voltage to the first predetermined value.

15. A semiconductor device including a synchronous rectifier controller, comprising:
a first comparator that detects a reset condition;
a second comparator that detects an ON condition;
a third comparator that detects an OFF condition; and
a control logic circuit that:
enters a wait state in response to a first detection of the reset condition,
performs a first assertion of a drive signal and exits the wait state in response to a first detection of the ON condition when the control logic circuit is in the wait state,
performs a de-assertion of the drive signal in response to the detection of the OFF condition, and
performs a second assertion of a drive signal in response to a second detection of the ON condition before a second detection of the reset condition,
wherein the second detection of the reset condition is a next detection of the reset condition after the first detection of the reset condition.

16. The semiconductor device of claim 15, further comprising:
an exception timer,
wherein the control logic circuit:
directs the exception timer to generate an exception interval in response to the first detection of the ON condition when the control logic circuit is in the wait state, the exception interval having a predetermined duration, and
prevents the assertion of the gate signal in an interval that begins at an end of the exception interval and ends at the second detection of the reset condition.

17. The semiconductor device of claim 15, further comprising:
a minimum time timer,
wherein the control logic circuit:
directs the minimum time timer to generate a blanking interval in response to the control logic circuit de asserting the drive signal, and
performs the second assertion of the drive signal only after the blanking interval.

18. The semiconductor device of claim 15, further comprising:
a minimum time timer,
wherein the control logic circuit:
directs the minimum time timer to generate a minimum on interval in response to the first assertion of the drive signal, the minimum on interval having a predetermined duration, and
performs the de-assertion of the drive signal only after an expiration of the minimum on interval.

19. The semiconductor device of claim 15, further comprising:
a minimum time timer,
wherein the control logic circuit enters the wait state by:
directing the minimum time timer to generate a minimum off interval in response to the first detection of the reset condition, the minimum off interval having a predetermined duration, and
entering the wait state in response to the expiration of the minimum off interval.

20. The semiconductor device of claim 15,
wherein the first comparator detects the reset condition by comparing a current sense voltage to a first predetermined value;
wherein the second comparator detects the ON condition by comparing the current sense voltage to a second predetermined value; and
wherein the third comparator detects the OFF condition by comparing the current sense voltage to a third predetermined value,
wherein the first, second, and third predetermined values are different from each other.

* * * * *